United States Patent [19]
Thornton, Jr.

[11] 3,858,082
[45] Dec. 31, 1974

[54] WARM WHITE LAMP WITH NORMAL OUTPUT AND IMPROVED COLOR RENDITION

[75] Inventor: William A. Thornton, Jr., Cranford, N.J.

[73] Assignee: Westinghouse Electric Corporation, Pittsburgh, Pa.

[22] Filed: Aug. 10, 1972

[21] Appl. No.: 279,562

Related U.S. Application Data

[63] Continuation-in-part of Ser. No. 96,744, Dec. 10, 1970, which is a continuation-in-part of Ser. No. 742,291, July 3, 1968, abandoned.

[52] U.S. Cl. ............................................. 313/487
[51] Int. Cl. ............................................. H01j 1/63
[58] Field of Search .............. 313/109; 252/301.4 P

[56] References Cited
UNITED STATES PATENTS

| | | | |
|---|---|---|---|
| 3,114,067 | 12/1963 | Henderson........................ | 313/109 |
| 3,287,586 | 11/1966 | Bickford........................... | 313/109 |
| 3,360,674 | 12/1967 | Mikus et al. ..................... | 313/109 |
| 3,449,258 | 6/1969 | Ropp et al. ................. | 252/301.4 P |
| 3,513,346 | 5/1970 | Awazu et al. ................. | 313/109 X |
| 3,544,481 | 12/1970 | Barry............................ | 252/301.4 |
| 3,577,169 | 5/1971 | Barry............................... | 313/109 |
| 3,599,028 | 8/1971 | Wanmaker et al. ............... | 313/109 |
| 3,602,757 | 8/1971 | Wachtel........................... | 313/109 |
| 3,630,947 | 12/1971 | Brixner...................... | 252/301.4 P |

OTHER PUBLICATIONS
"Fluorescent Lamps and Lighting," Edited by W. Elenbaas, Chapter III, Sections 3.1 and 3.5, pages 31,32,33,42,43,44,(1962).

*Primary Examiner*—Ronald L. Wibert
*Assistant Examiner*—Richard A. Rosenberger
*Attorney, Agent, or Firm*—R. A. Stoltz

[57] ABSTRACT

A lamp to generate three narrow band emissions which together provide white light with both high color rendition and high efficiency. The lamp uses a substantially homogeneous mixture of phosphors in which 3–40 percent by weight is a blue-emitting phosphor, 20–50 percent by weight is a green-emitting phosphor and 10–70 percent by weight is a red-emitting phosphor and in which the blue-emitting phosphor is at least one of strontium chloroapatite activated by divalent europium, alumino silicate activated with divalent europium, and calcium-barium-magnesium silicate activated with divalent europium, the green-emitting phosphor is at least one of zinc silicate activated with manganese, zinc germanate activated with manganese, zinc silico germanate activated with manganese, yttrium silicate activated with terbium, and zinc borate activated with terbium, and the red-emitting phosphor is at least one of yttrium oxide activated with trivalent europium, lithium indate activated with trivalent europium, yttrium vanadate activated with trivalent europium, and yttrium phosphate vanadate activated with trivalent europium. Preferably, the blue-emitting phosphor is strontium chloroapatite activated by divalent europium, the green-emitting phosphor is zinc silicate activated with manganese, and the red-emitting phosphor is yttrium oxide activated with trivalent europium.

8 Claims, 3 Drawing Figures

WARM WHITE LAMP WITH NORMAL OUTPUT AND IMPROVED COLOR RENDITION

CROSS REFERENCE TO RELATED APPLICATIONS

This application is a continuation-in-part of copending application, Ser. No. 96,744, filed Dec. 10, 1970 by the instant inventor and owned by the present assignee which application was in turn a continuation-in-part of Ser. No. 742,291, filed July 3, 1968 by the instant inventor owned by the present assignee and now abandoned. In this copending application is disclosed a device for generating three narrow band emissions (green, red, and blue) to efficiently generate white light with good color rendition of illuminated objects. In addition to giving the desired wavelength ranges for the three different emissions, this copending application also discloses combinations of phosphors in accordance with the invention. The instant invention discloses additional combinations of phosphors which are within the concept of this copending application, but provide essentially the same performance as the better performing previously disclosed phosphors at considerably lower cost.

In copending application, Ser. No. 279,561, now abandoned filed concurrently herewith by the instant inventor, and owned by the present assignee, is disclosed a luminescent discharge lamp using at least one wide band halophosphate phosphor supplemented with at least two narrow band phosphors, which wideband-narrow band phosphors provide good color rendition at generally high efficiency. The instant invention uses enumerated narrow band emitting phosphors and obtains higher efficiency than the wide band-narrow band phosphors of this concurrently filed application.

A narrow band phosphor as used herein, means a phosphor whose visible emission is located substantially within an 80 nm wavelength range. A wide band phosphor is one whose visible emission is so broad that there is no 80 nm wavelength range in which its visible emission is substantially located.

BACKGROUND OF THE INVENTION

This invention relates to luminescent discharge lamps which use phosphors to generate white light. Such a lamp is designed to generate radiations of a "white" color as efficiently as possible, with as good a color rendition of illuminated objects as possible. In fluorescent lamps the so-called halophosphate phosphor is generally used throughout the industry and is available in a variety of shades of white. Conventionally, the shades of white have represented various compromises between high efficiency (high lumens per watt) and a reasonably high color rendering index.

The term "white" as well as several common shades of white, such as Warm White, Cool White, and Daylight, are defined in the aforementioned copending application Ser. No. 96,744. The internationally accepted method for standardizing and measuring the color rendering properties of light sources is set forth in the publication of the International Commission on Illumination, identified as publication C.I.E. No. 13 (E-1.3.2) 1965.

The fact that heretofore improved color rendition could only be obtained by sacrificing efficiency can be illustrated by comparison of the commercially availabe shades of white of Warm White, Cool White, and Daylight. A 40 watt Warm White fluorescent lamp typically gives approximately 3,300 lumens with a color rendering index of only about 50. A 40 watt Cool White fluorescent has a somewhat better color rendering index of about 65, but gives the somewhat lower output of about 3,000 lumens. The Daylight 40 watt fluorescent gives a still better color rendering index of about 76 but at the even lower output of about 2,500 lumens.

One method of summarizing the performance of these lamps is to express lamp performance in terms of the product of color rendering index and lumens per watt. Expressed in such terms, conventional fluorescent lamps have performance ranging between 4,000 and 5,400.

SUMMARY OF THE INVENTION

This invention provides lamps with combined color rendition and efficiency significantly better than the halophosphate lamps of the prior art. This invention provides lamps with a product of color rendering index and lumens per watt of approximately 6,300–7,000, as compared to the 4,000–5,400 of halophosphate lamps. The luminescent discharge lamp of this invention will efficiently generate three narrow band emissions which together provide white light of the quality which will provide illuminated objects with the color appearances resonably representative of the color appearance of the objects under natural light. The lamps contain a light generating medium which is a substantially homogeneous mixture of phosphors, which mixture by constituent weight percent substantially comprises:

i. 3–40 percent of a blue-emitting phosphor consisting essentially of at least one of strontium chloroapatite activated by divalent europium, alumino silicate activated with divalent europium and calcium-barium-magnesium silicate activated with divalent europium;

ii. 20–50 percent of a green-emitting phosphor consisting essentially of at least one of zinc silicate activated with manganese, zinc germanate activated with manganese, zinc silicogermanate activated with manganese, yttrium silicate activated with terbium, and zinc borate activated with terbium; and iii. 10–70 percent of a red-emitting phosphor consisting essentially of at least one of yttrium oxide activated with trivalent europium, lithium indate activated with trivalent europium, yttrium vanadate activated with trivalent europium, and yttrium phosphate vanadate activated with trivalent europium.

DESCRIPTION OF THE PREFERRED EMBODIMENTS

Figure 1:
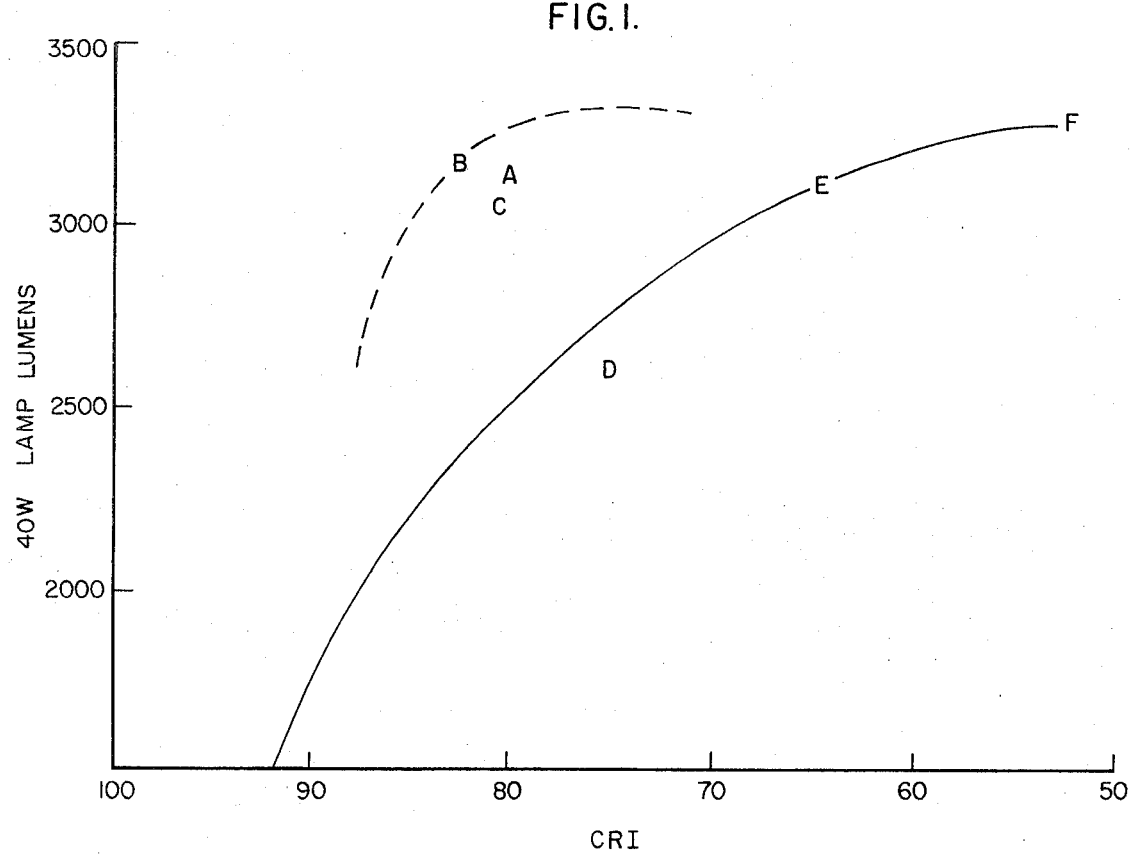
FIG. 1 is a graph of lumens for a 40 watt lamp, versus color rendering index for lamps of the present invention and of halophosphate lamps of the prior art.

With reference to FIG. 1, there is shown a point representing the lumens and color rendering index of an improved Daylight lamp (point A) of an improved Cool White lamp (point B) and of an improved Warm White lamp (point C), made in accordance with the present invention. Also shown are points for the conventional halophosphate lamps, (Daylight lamp point D, Cool White lamp point E, and Warm White lamp point F) representative of the standard fluorescent lamps of the prior art. It can be seen that in the prior art it was necessary to accept lower efficiency (lumens per watt) in order to obtain a higher color rendering index. The curve drawn through points D, E, and F is representative of the tradeoff of efficiency and color rendition which was made in the prior art. Points for halophosphate lamp with other common lamp colors such as White, Deluxe Warm White, Soft White, Deluxe Cool White, and Bluish White are not shown, but would be along the curve or below the curve of the standard commercial fluorescent lamps. It can be seen that the lamps of the instant invention obtain both high efficiency and high color rendering index, and thus fall well above the curve of the standard commercial fluorescent lamps.

Figure 2:
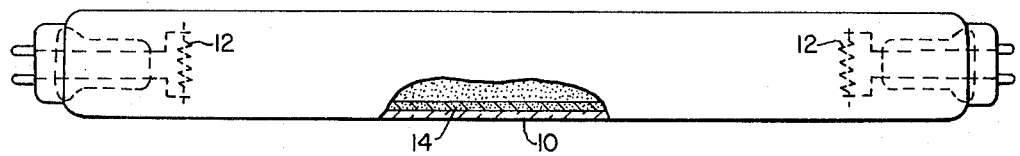
FIG. 2 is an elevation partly in section of a low pressure mercury discharge lamp coated with a substantially homogeneous mixture of phosphors.

With references to FIG. 2, there is shown a low pressure mercury vapor fluorescent lamp, wherein a conventional, elongated, tubular, soda-lime glass envelope 10 has operative discharge sustaining electrodes 12 at opposite ends. The discharge sustaining material comprises mercury and inert gas filling as is well known in the art. A layer 14 of a substantially homogeneous mixture of phosphors is disposed on the interior surface of the envelope 10.

As is well known in the art, a low pressure mercury discharge produces mercury resonance radiation which has a significant ultraviolet component. In a fluorescent lamp it is this ultraviolet component, primarily at 254 nanometers, which energizes the mixtures of phosphors to a visible light generating condition. Other methods of energizing the mixture of phosphors, such as high pressure mercury discharges, can also be used.

The substantially homogeneous mixture of phosphors substantially comprise a blue-emitting phosphor, a green-emitting phosphor, and a red-emitting phosphor. The blue-emitting phosphor consists essentially of at least one of strontium chloroapatite activated by divalent europium, alumino silicate activated with divalent europium, and calcium-barium-magnesium silicate activated with divalent europium. The green-emitting phosphor consists essentially of at least one of zinc silicate activated with manganese, zinc germanate activated with manganese, zinc silicogermanate activated with manganese, yttrium silicate activated with terbium, and zinc borate activated with terbium. The red-emitting phosphor consists essentially of at least one of yttrium oxide activated with trivalent europium, lithium indate activated with trivalent europium, yttrium vanadate activated with trivalent europium, and yttrium phosphate vanadate activated with trivalent europium.

The following are specific examples of mixtures by weight percent of phosphors in accordance with the present invention and which provide, in 40 watt lamps, about 2,900–3,300 lumens at color rendering index (CRI) of about 70–85.

EXAMPLE 1

The following mixture of phosphors will, in a 40 watt fluorescent lamp, generate about 3,300 lumens of white light at a CRI of about 85 (product of lumens per watt times CRI of about 7,000) of a quality of the Warm White chromaticity specification:

7 percent strontium chloroapatite activated by divalent europium, 37 percent zinc silicate activated with manganese, and 56 percent yttrium oxide activated with trivalent europium.

EXAMPLE 2

The following ranges of phosphors will generate white light generally of a quality of the Warm White chromaticity specification:

3–11 percent of strontium chloroapatite activated with divalent europium, 27–46 percent of zinc silicate activated with manganese, and 46–70 percent of yttrium oxide activated with trivalent europium.

EXAMPLE 3

The following mixture of phosphors will, in a 40 watt fluorescent lamp, generate about 3,300 lumens of white light at a CRI of about 82 (product of lumens per watt times CRI of over 6,700) of a quality of the Cool White chromaticity specification:

15.5 strontium chloroapatite activated with divalent europium, 41 percent zinc silicate activated with manganese, and 43.5 percent yttrium oxide activated with trivalent europium.

EXAMPLE 4

The following ranges of mixtures of phosphors will generate about 3,150 to 3,300 lumens of white light of CRI of 80–85 generally of a quality of the Cool White chromaticity specification:

11–22 percent of strontium chlorapatite activated with divalent europium, 30–50 percent of zinc silicate activated with manganese, and 30–55 percent of yttrium oxide activated with trivalent europium.

EXAMPLE 5

Results similar to Example 1 can be obtained when alumino silicate activated with divalent europium is substituted for strontium chloroapatite activated by divalent europium in Example 1.

EXAMPLE 6

Warm White light is also obtained where zinc germanate activated with manganese is substituted for the zinc silicate activated with manganese in Example 1.

EXAMPLE 7

Results similar to Example 2 can be obtained when lithium indate activated with trivalent europium is substituted in part or in whole for the yttrium oxide activated with trivalent europium in Example 2.

EXAMPLE 8

White light can be generated by a mixture of 40 percent alumino silicate activated with divalent europium, 20 percent zinc silicate activated with manganese and 40 percent yttrium vanadate activated with trivalent europium.

EXAMPLE 9

White light can be generated by 40 percent calcium-barium-manganese silicate activated with divalent europium, 50 percent zinc silicogermanate activated with manganese, and 10 percent yttrium oxide activated with trivalent europium.

EXAMPLE 10

White light can be generated by 15 percent strontium chloroapatite activated with divalent europium, 41 percent yttrium silicate activated with terbium, and 44 percent yttrium phosphate vanadate activated with trivalent europium.

EXAMPLE 11

White light can be generated when zinc borate activated with terbium is substituted in whole or in part for the yttrium silicate activated with terbium in Example 10.

Any of the blue-emitting phosphors can be substituted in whole or in part for any other blue-emitting phosphor and white light will still be generated of a quality which will provide illuminated objects with a color appearance reasonably representative of the color appearance under natural light. Similarly, any of the enumerated green-emitting phosphors can be substituted in whole or in part for any other of the green-emitting phosphors, or any of the enumerated red-emitting phosphors can be substituted in whole or in part for any of the other red-emitting phosphors. While some modification of percentages may be required, all combinations of phosphors can be blended to give about 3,150–3,300 lumens from a 40 watt lamp at CRI's of about 80–85, and therefore products of lumen per watt times CRI of about 6,300–7,000.

Figure 3:
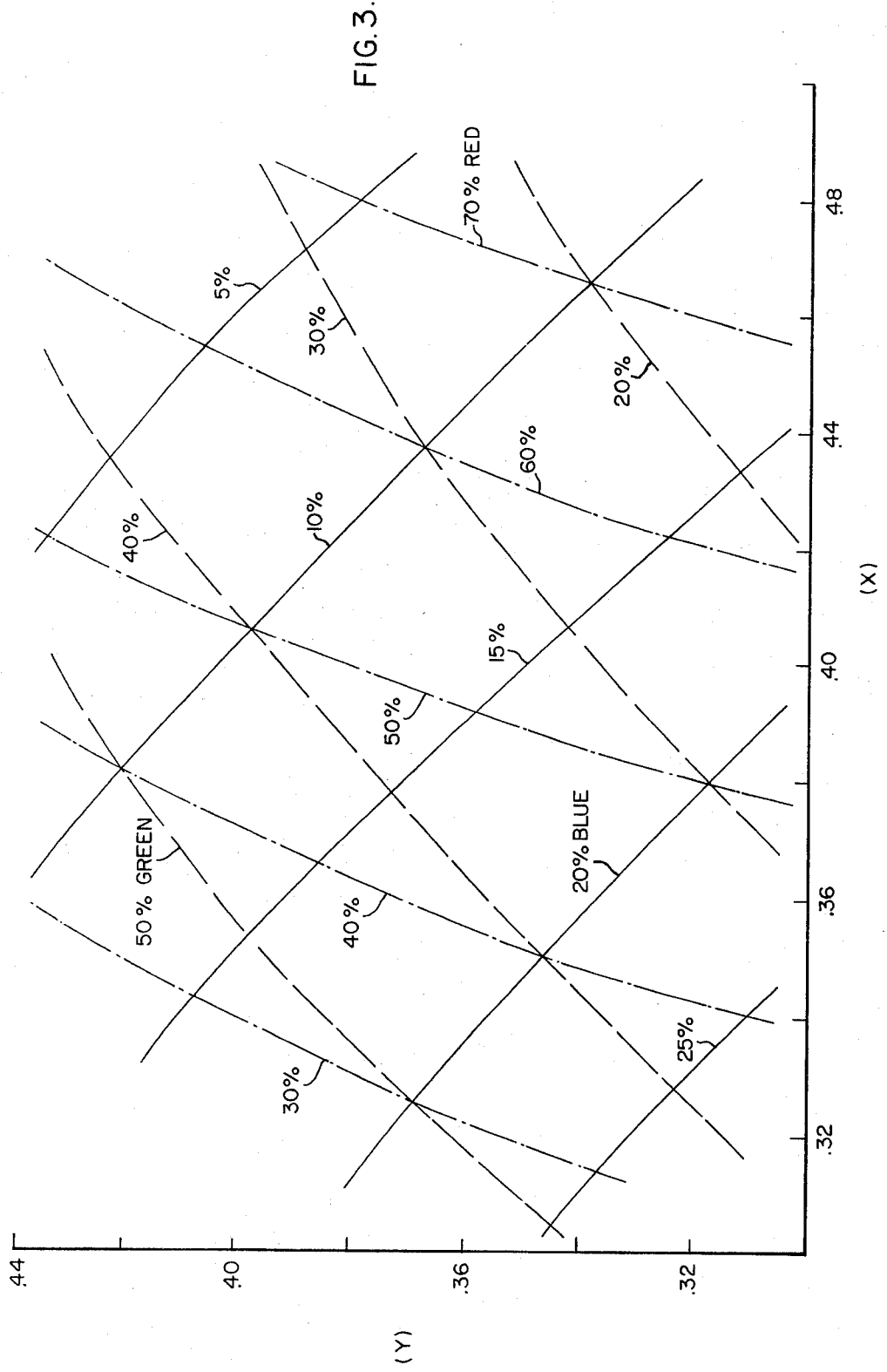
FIG. 3 is a graph of a C.I.E. chromaticity diagram demonstrating part of the range of colors of the lamp light which can be generated by three component blends of strontium chloroapatite activated with divalent europium, zinc silicate activated with manganese, and yttrium oxide activated with trivalent europium.

With reference to FIG. 3 there is shown a blending diagram for strontium chloroapatite activated by divalent europium as the blue-emitting phosphor, zinc silicate activated with manganese as the green-emitting phosphor, and yttrium oxide activated with trivalent europium as the red-emitting phosphor with approximate percentages of each of the phosphors shown as a function of color on the CIE color diagram. The oval CW on FIG. 3 represents the general area of the Cool White chromaticity specification and the oval WW represents the general area of the Warm White chromaticity specification.

I claim as my invention:

1. A luminescent discharge lamp which will efficiently generate white light of a quality which will provide illuminated objects with a color appearance reasonably representative of the color appearance of said objects under natural light, said lamp comprising:
   a. a light generating medium which is a substantially homogenous mixture of phosphors, said mixture by constituent weight percent substantially comprising:
   i. 3–40 percent of a blue-emitting phosphor consisting essentially of at least one of strontium chloroapatite activated by divalent europium, alumino silicate activated with divalent europium, and calcium-barium-magnesium silicate activated with divalent europium;
   ii. 20–50 percent of a green-emitting phosphor consisting essentially of at least one of zinc silicate activated with manganese, zinc germanate activated with manganese, zinc silicogermanate activated with manganese, yttrium silicate activated with terbium and zinc borate activated with terbium; and
   iii. 10–70 percent of a red-emitting phosphor consisting essentially of at least one of yttrium oxide activated with trivalent europium, lithium indate activated with trivalent europium, yttrium vanadate activated with trivalent europium, and yttrium phosphate vanadate activated with trivalent europium; and
   b. means for energizing said mixture of phosphors to a visible-light-generating condition.

2. The lamp of claim 1, wherein said blue-emitting phosphor is strontium chloroapatite activated with divalent europium and said red-emitting phosphor is yttrium oxide activated with trivalent europium.

3. The lamp of claim 1, wherein said blue-emitting phosphor is strontium chloroapatite activated with divalent europium and said green-emitting phosphor is zinc silicate activated with manganese.

4. The lamp of claim 1, wherein said red-emitting phosphor is yttrium oxide activated with trivalent europium and said green-emitting phosphor is zinc silicate activated with manganese.

5. The lamp of claim 1, wherein said blue-emitting phosphor is strontium chloroapatite activated with divalent europium, said green-emitting phosphor is zinc silicate activated with manganese, and said red-emitting phosphor is yttrium oxide activated with trivalent europium.

6. The lamp of claim 5, wherein 3–11 percent of strontium chloroapatite activated with divalent europium, 27–46 percent of zinc silicate activated with manganese, and 46–70 percent of yttrium oxide activated with trivalent europium are used, whereby said lamp will generate white light generally of a quality of the Warm White chromaticity specification.

7. The lamp of claim 5, wherein 11–22 percent of strontium chloroapatite activated with divalent europium, 30–50 percent of zinc silicate activated with manganese, and 30–55 percent of yttrium oxide activated with trivalent europium are used, whereby said lamp will generate white light generally of a quality of the Cool White chromaticity specification.

8. The lamp of claim 1, wherein said lamp is a fluoroscent lamp having a product of color rendering index and lumens per watt of approximately 6,300–7,300.

* * * * *